No. 857,364. PATENTED JUNE 18, 1907.
F. P. ROSBACK.
BRICKMAKING MACHINE.
APPLICATION FILED FEB. 28, 1907.

12 SHEETS—SHEET 1.

Witnesses:
Chas. E. Gaylord.
John Enders.

Inventor:
Frederich P. Rosback,
By Dyrenforth, Dyrenforth, Lee & Wiles,
Attys.

No. 857,364.

PATENTED JUNE 18, 1907.

F. P. ROSBACK.
BRICKMAKING MACHINE.
APPLICATION FILED FEB. 28, 1907.

12 SHEETS—SHEET 3.

No. 857,364. PATENTED JUNE 18, 1907.
F. P. ROSBACK.
BRICKMAKING MACHINE.
APPLICATION FILED FEB. 28, 1907.

12 SHEETS—SHEET 4.

Witnesses:
Chas. E. Gaylord,
John Enders.

Inventor:
Frederick P. Rosback,
By Dyrenforth, Dyrenforth, See & Wiles,
Attys.

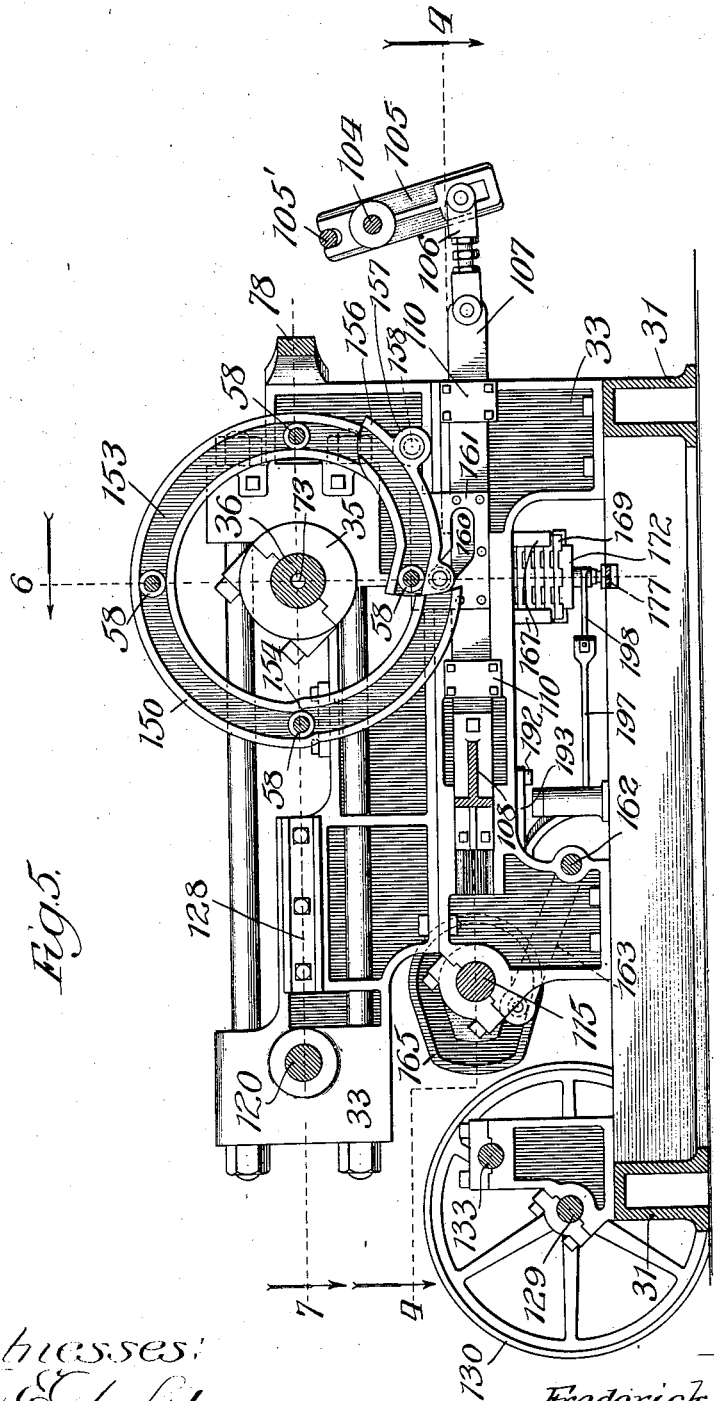

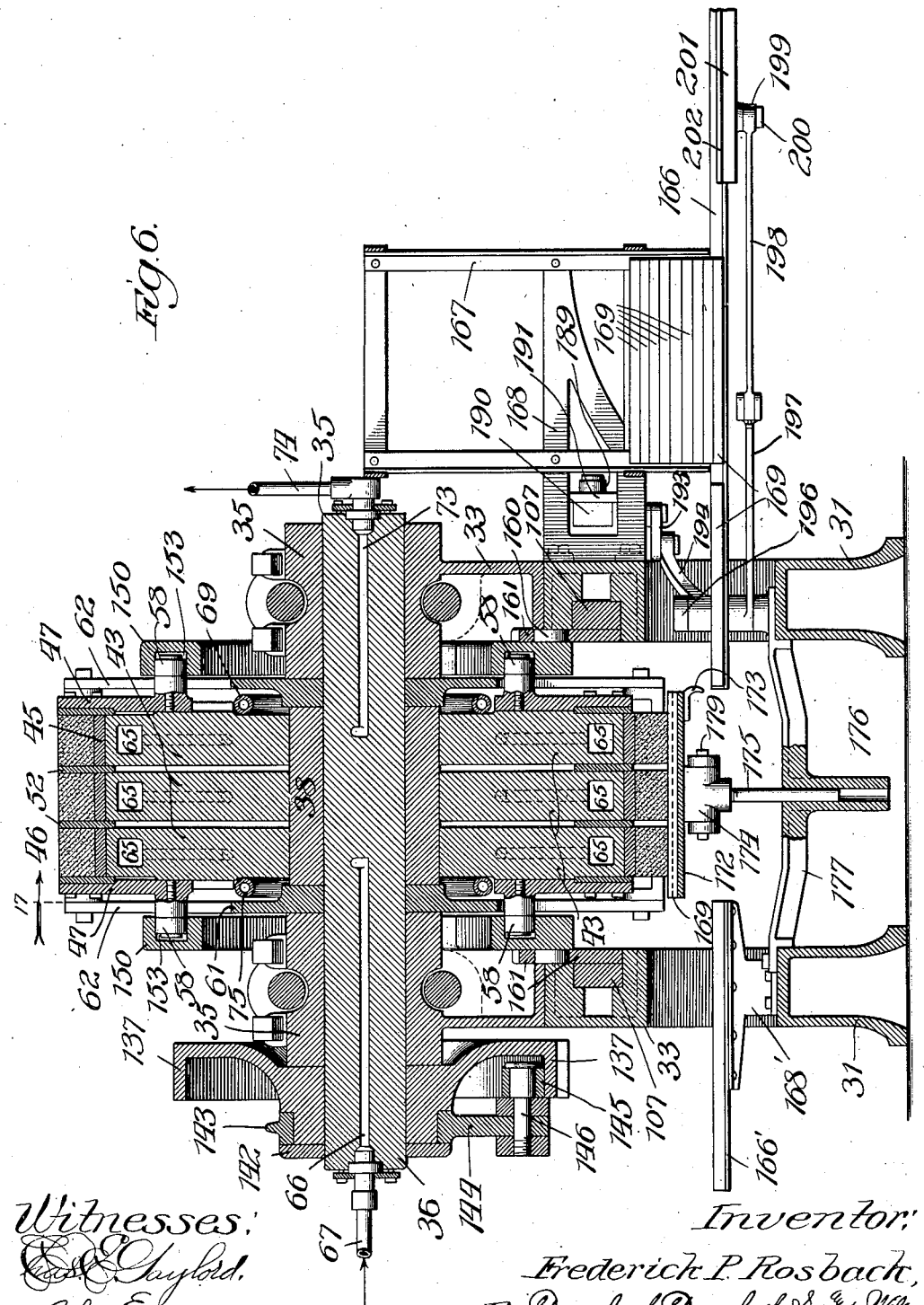

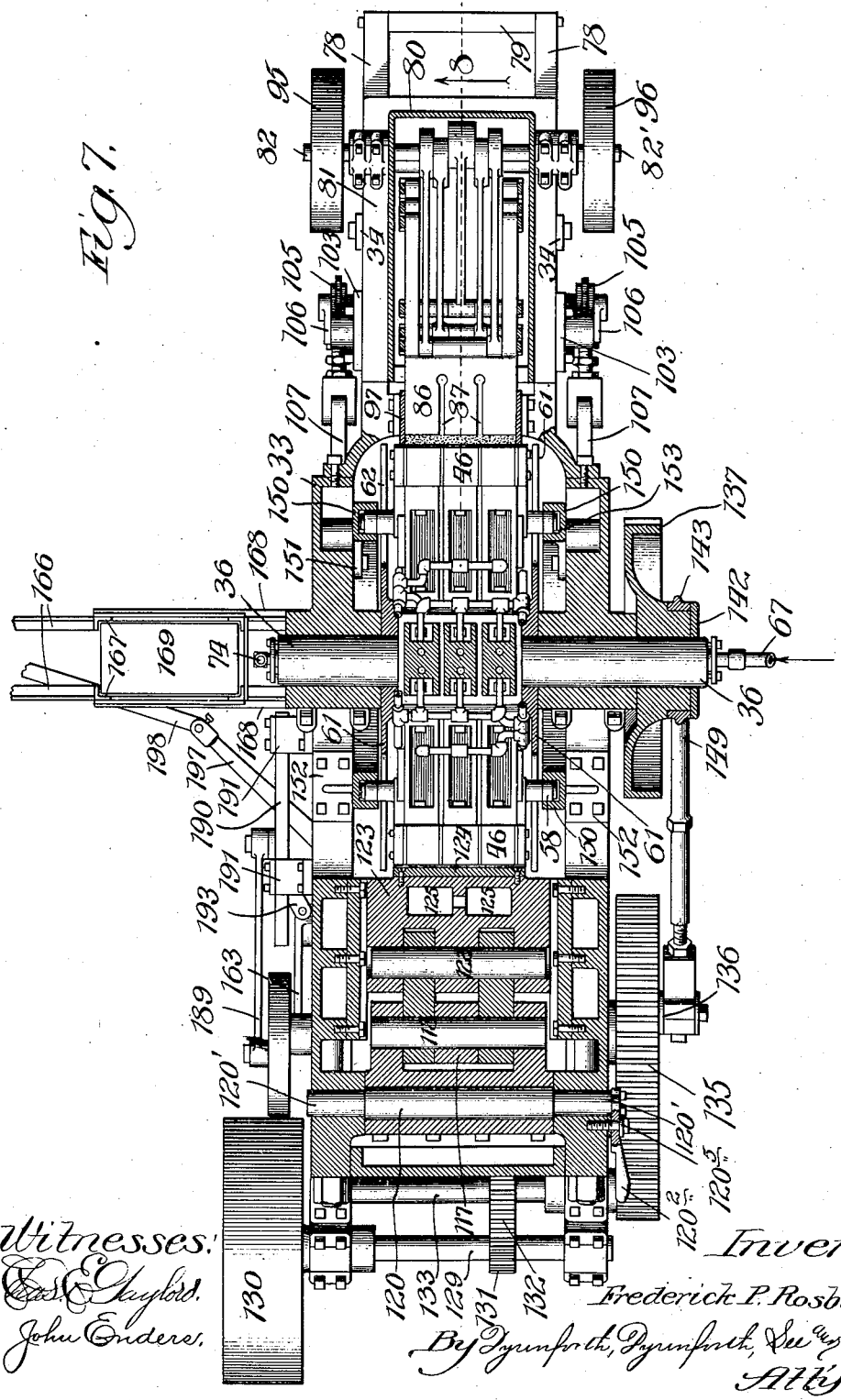

No. 857,364.
PATENTED JUNE 18, 1907.
F. P. ROSBACK.
BRICKMAKING MACHINE.
APPLICATION FILED FEB. 28, 1907.
12 SHEETS—SHEET 8.
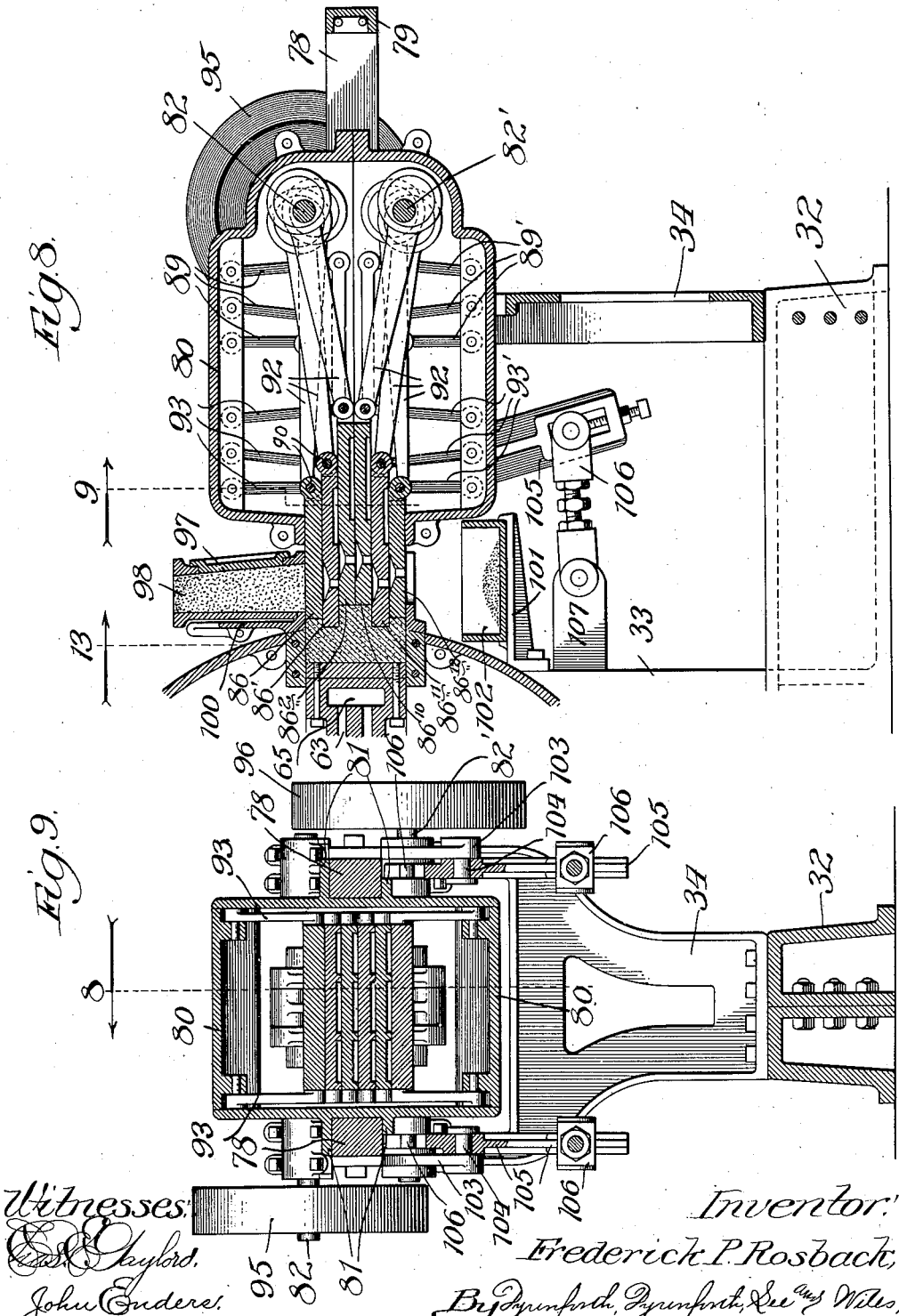
Witnesses:
Inventor:
Frederick P. Rosback,

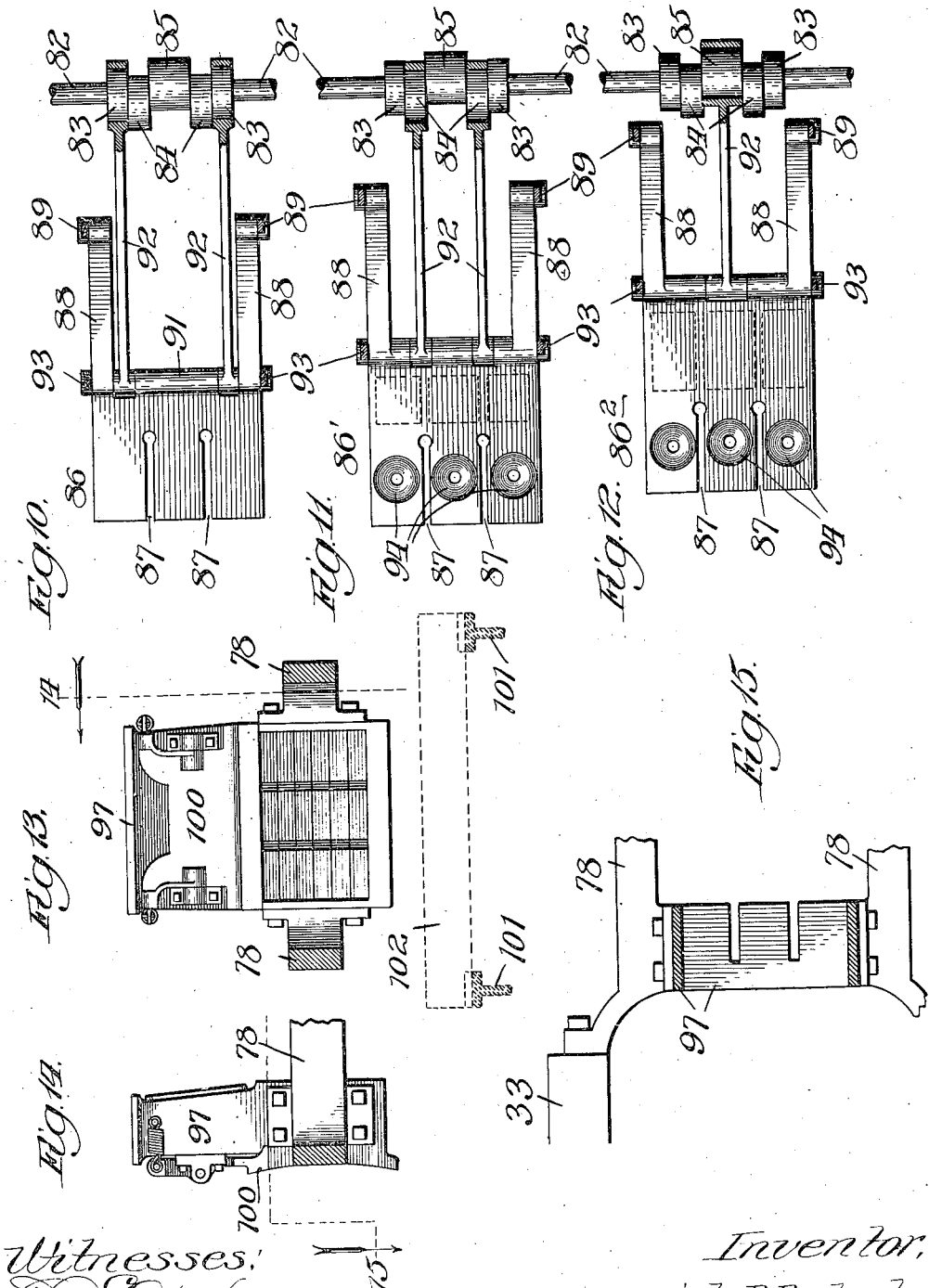

No. 857,364. PATENTED JUNE 18, 1907.
F. P. ROSBACK.
BRICKMAKING MACHINE.
APPLICATION FILED FEB. 28, 1907.
12 SHEETS—SHEET 10.
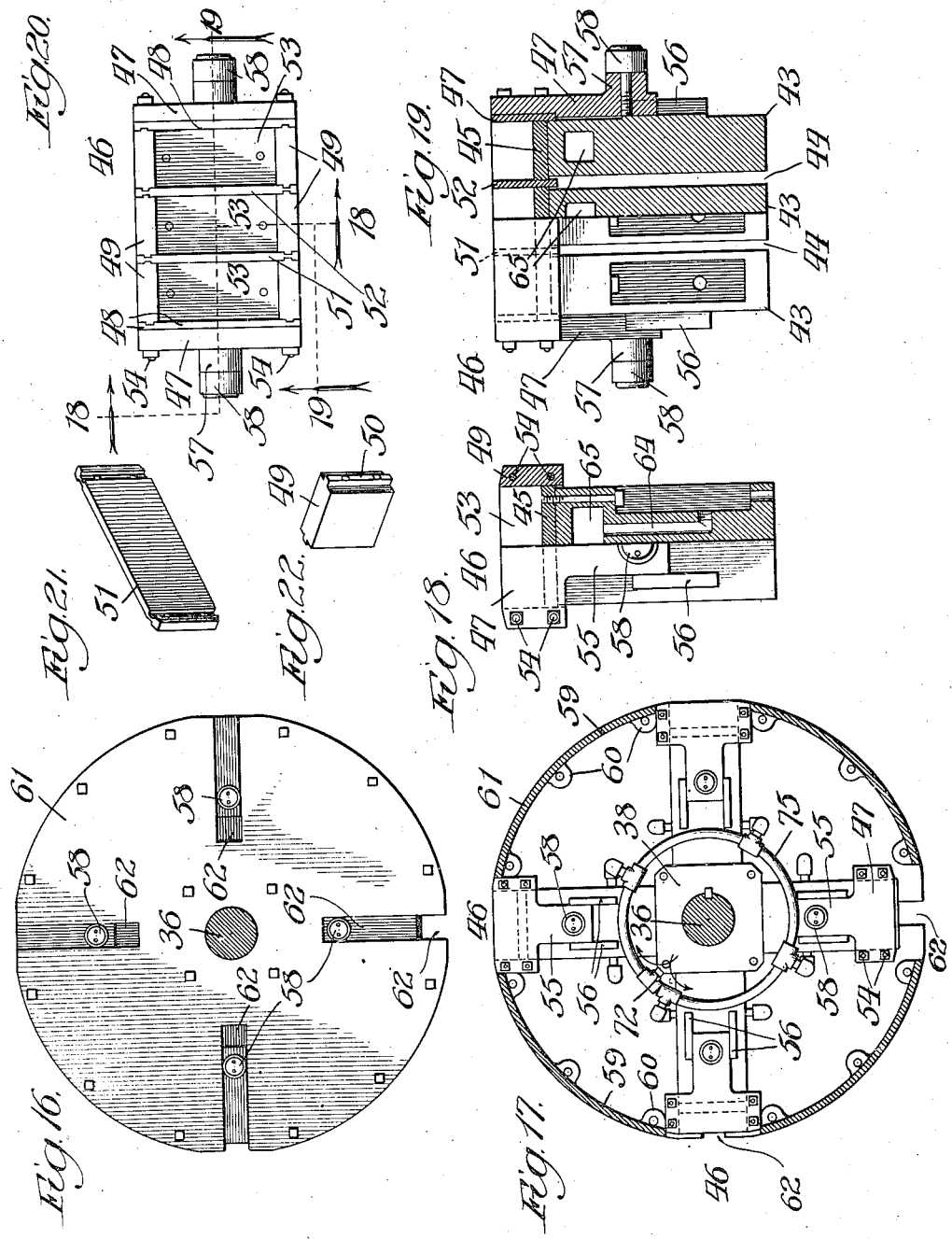
Witnesses:
Inventor:
Frederick P. Rosback,

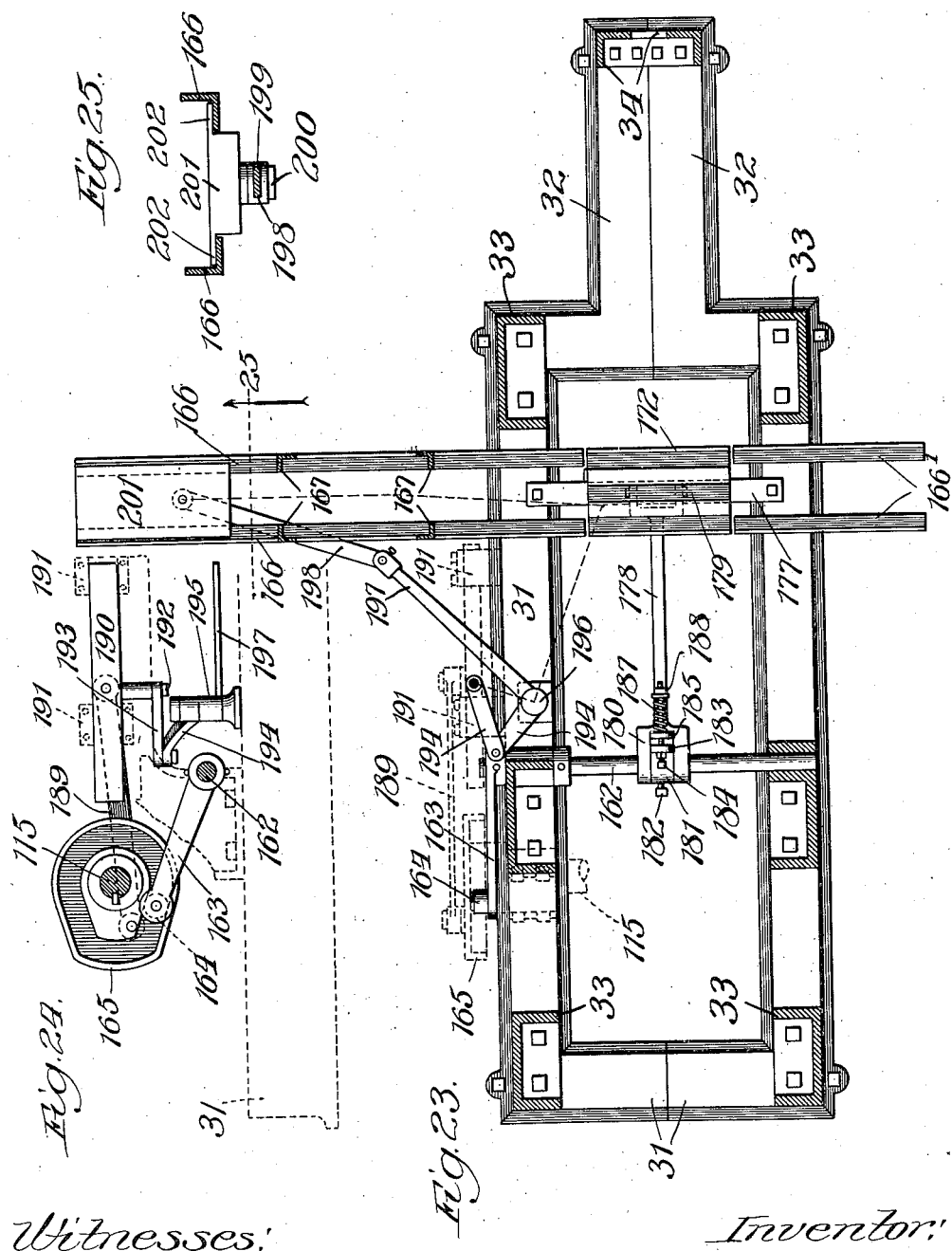

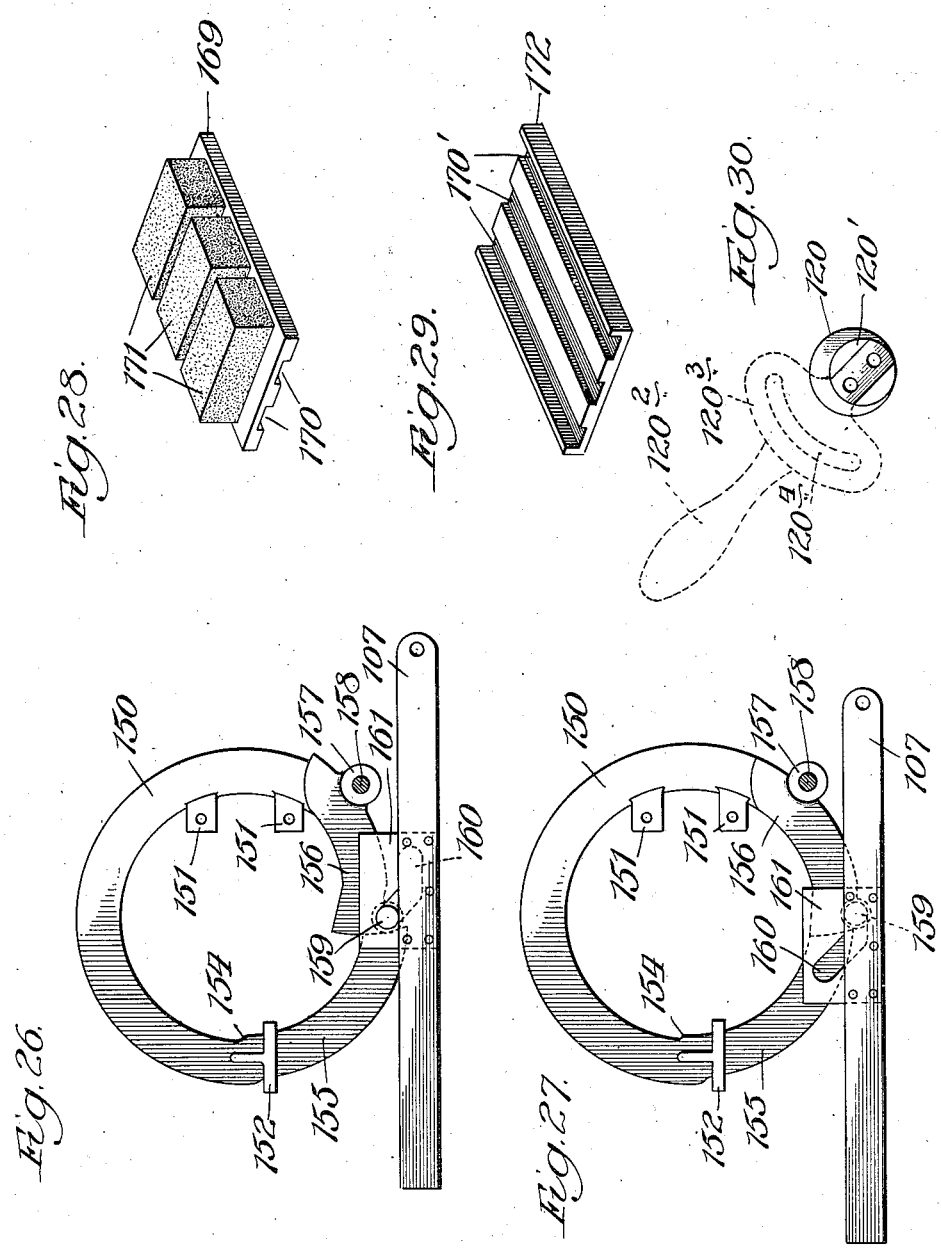

UNITED STATES PATENT OFFICE.

FREDERICK P. ROSBACK, OF BENTON HARBOR, MICHIGAN.

BRICKMAKING-MACHINE.

No. 857,364.  Specification of Letters Patent.  Patented June 18, 1907.

Application filed February 28, 1907. Serial No. 359,875.

*To all whom it may concern:*

Be it known that I, FREDERICK P. ROSBACK, a citizen of the United States, residing at Benton Harbor, in the county of Berrien and State of Michigan, have invented a new and useful Improvement in Brickmaking-Machines, of which the following is a specification.

My invention relates to improvements in the class of rotary machines for making brick, or blocks for building purposes, more particularly out of cement or concrete, and employing to that end an intermittently revolving drum equipped with molds at intervals, whereby each partial rotation of the drum brings one mold into position for feeding and compacting into it the material to form one or more bricks or blocks, another mold into position to have the material, previously fed and compacted into it, pressed to complete the molded article, and still another mold into position to deliver the previously completed article.

The object of my invention is, generally stated, to improve the construction and manner of operation of machines in the class referred to, by novel organizations of parts and novel features, to the primary end of improving the product of such machines.

Figure 1:
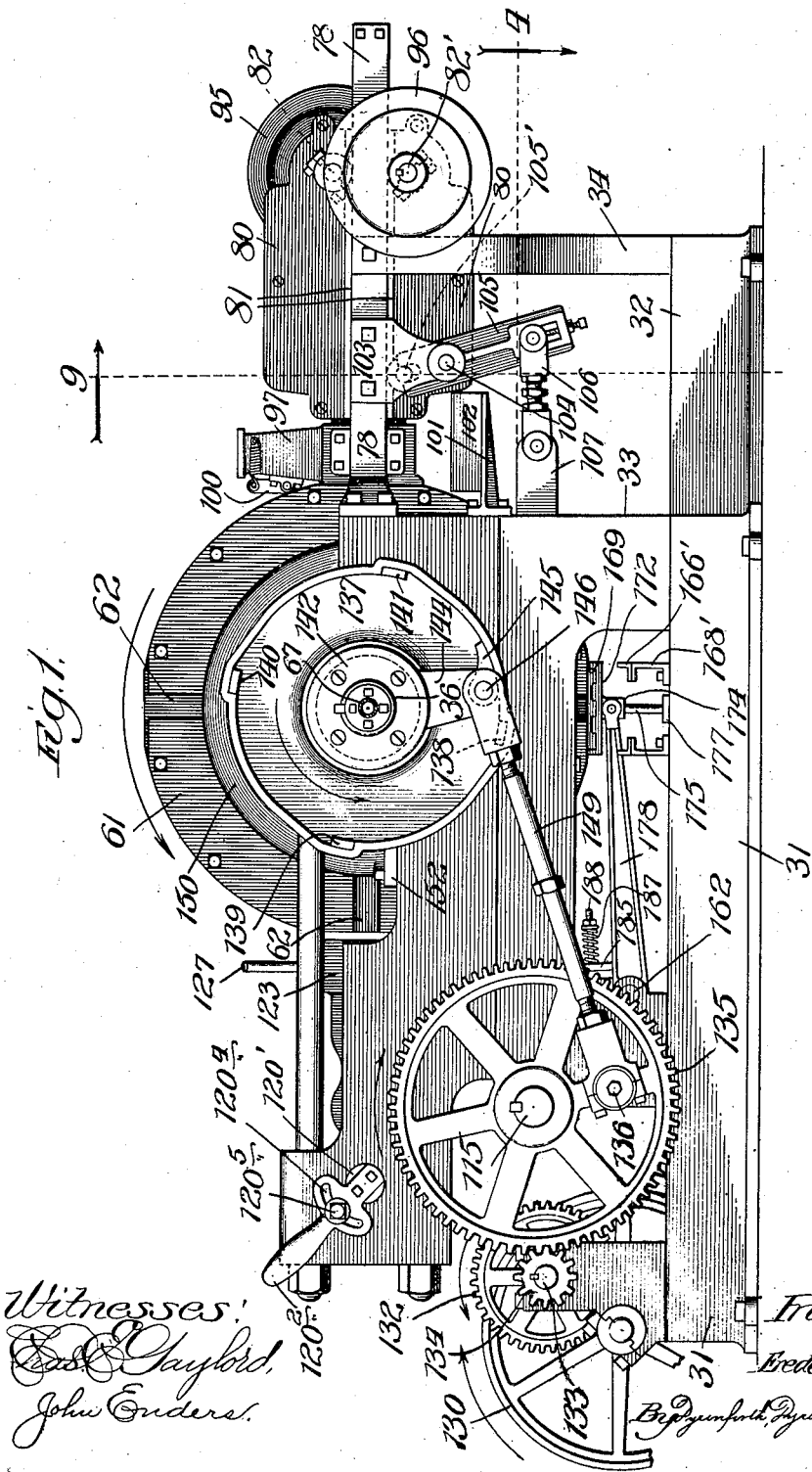
Figure 2:
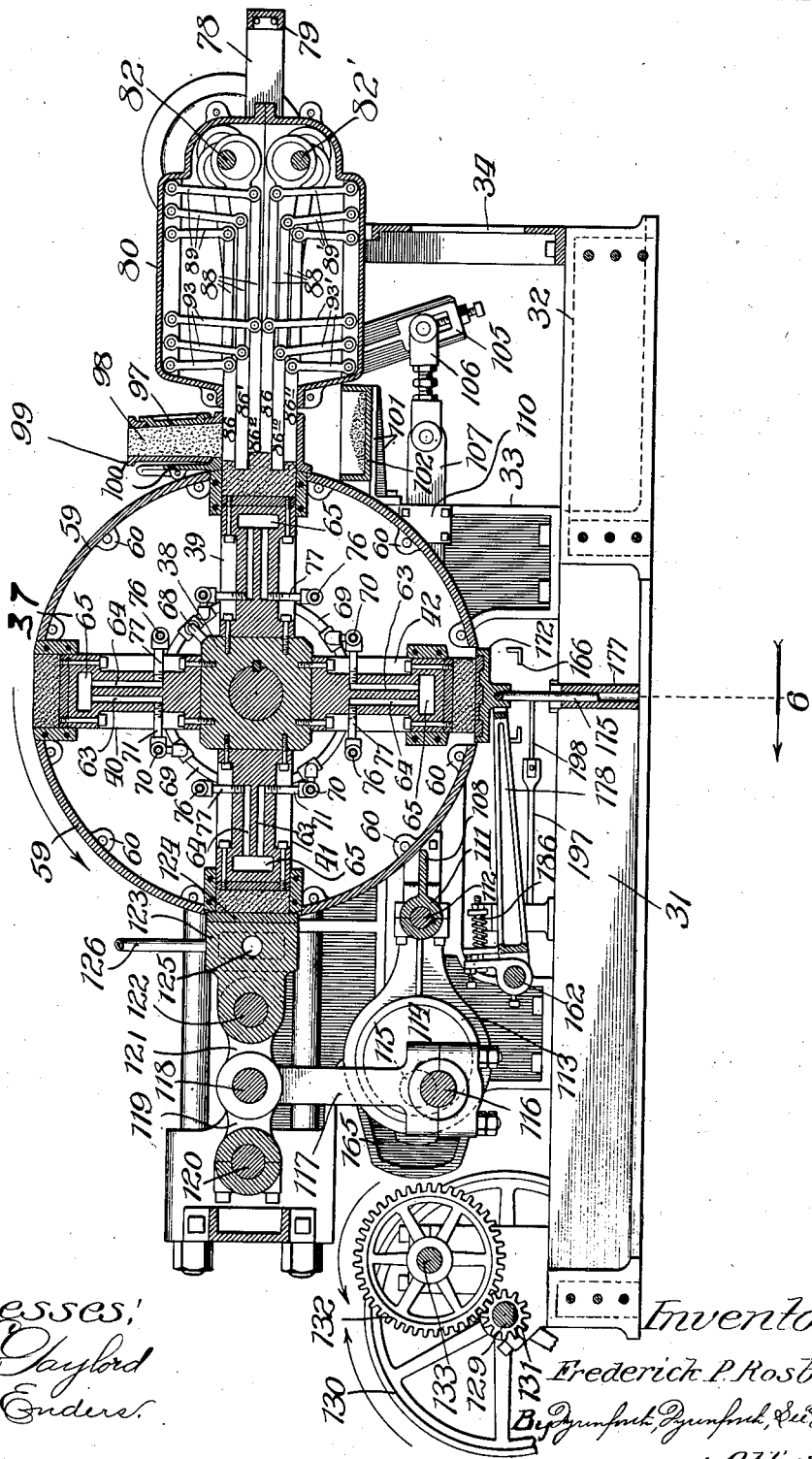
Figure 3:
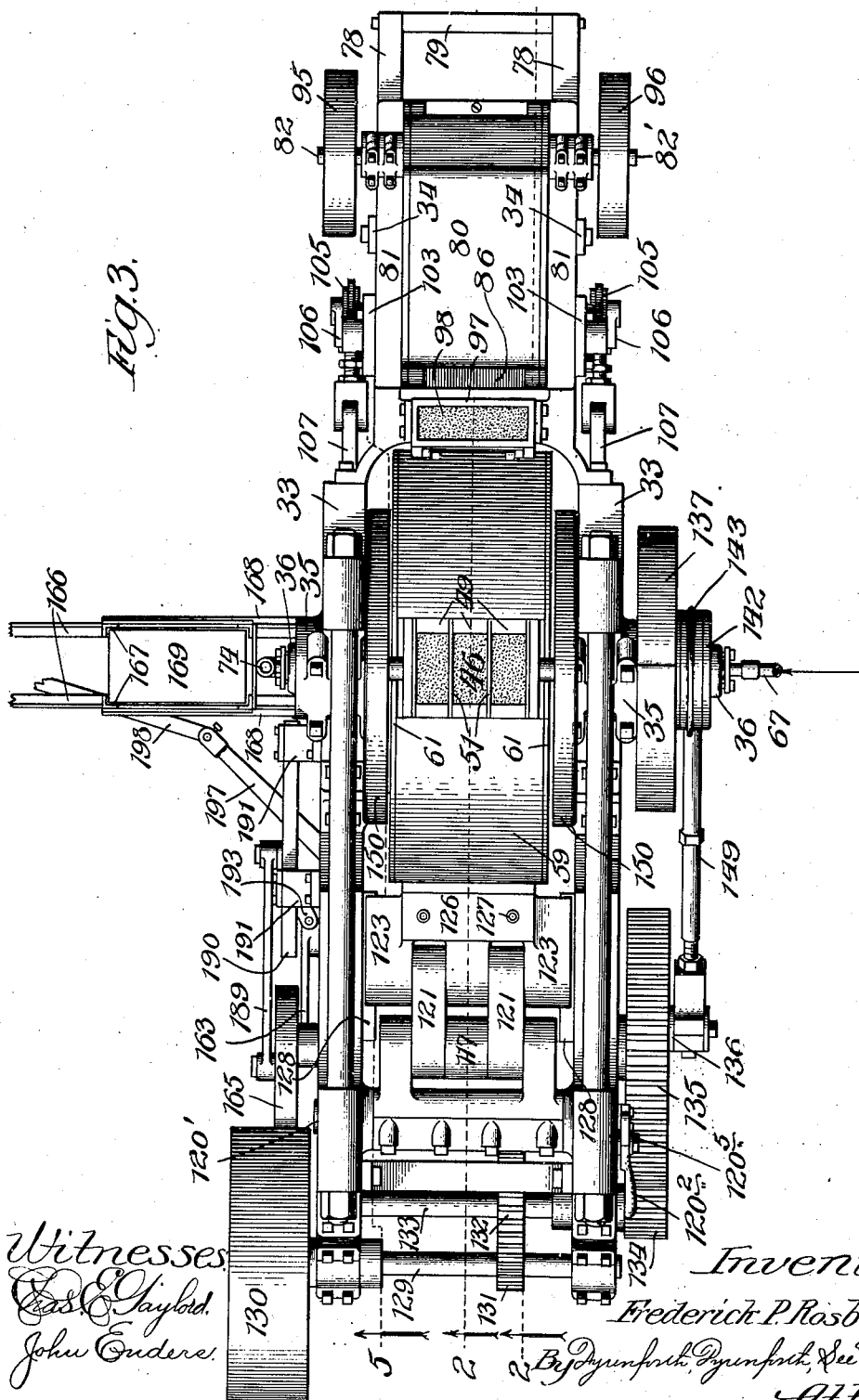
Figure 4:
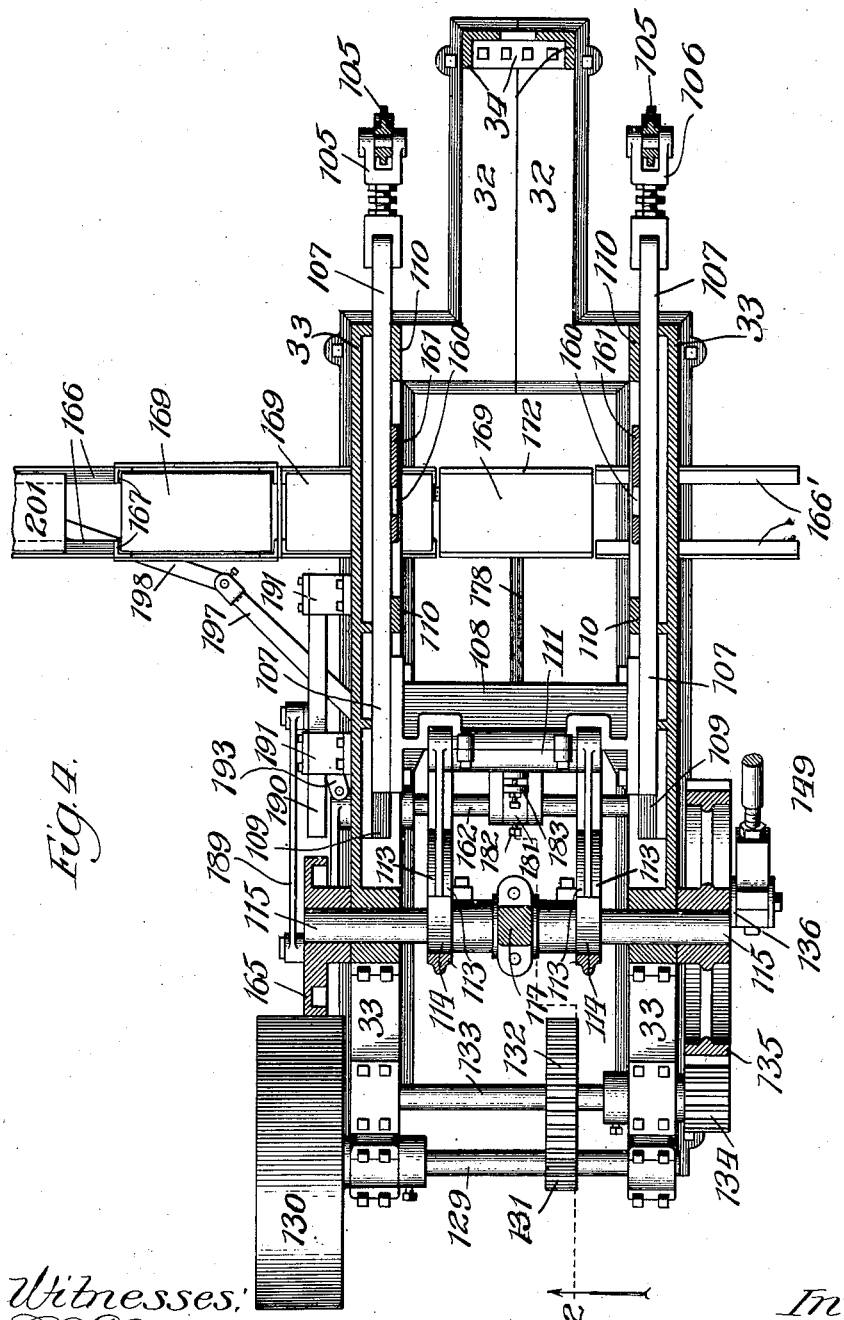

Referring to the accompanying drawings—Figure 1 shows my improved brick-press by a view in side elevation; Fig. 2 is a vertical longitudinal section taken at the line 2 on Fig. 3, or at the same line on Fig. 4, and viewed in the direction of the arrow; Fig. 3, a plan view of the machine; Fig. 4, a plan section taken at the line 4 on Fig. 1, or at the same line on Fig. 5, and viewed in the direction of the arrow; Fig. 5, a vertical longitudinal section taken at the line 5 on Fig. 3 and viewed in the direction of the arrow; Fig. 6, a transverse section taken at the line 6 on Fig. 2, or at the same line on Fig. 5, viewed in the direction of the arrow and enlarged; and Fig. 7, a plan section taken at the line 7 on Fig. 5 and viewed in the direction of the arrow; Fig. 8 is a broken vertical section taken at the line 8 on Fig. 7, or at the same line on Fig. 9, viewed in the direction of the arrow and enlarged, this view showing the right-hand end-portion of the machine as presented in Fig. 1, to illustrate, more especially, the tampers and their immediate operating mechanism, and Fig. 9, a transverse section taken at the line 9 on Fig. 8 and viewed in the direction of the arrow; Figs. 10, 11 and 12 are plan views partly broken and sectional, showing respectively the upper, intermediate and lower tampers of the upper of the two sets thereof, and their eccentric-rod connections with their operating shaft; Fig. 13, a view showing the tampers, their housing, and the feed-box in end elevation, the view being a section taken through the box-supports at the line 13 on Fig. 8, and viewed in the direction of the arrow; Fig. 14, a view in side elevation of the tamper-housing and feed-box with their disclosed supporting member shown broken and sectional, the section being taken at the line 14 on Fig. 13, and viewed in the direction of the arrow, and Fig. 15, a broken plan section of the tamper-housing, taken at the line 15 on Fig. 14, and viewed in the direction of the arrow; Fig. 16 is a view in elevation of one of the two similar drum-heads, showing the drum-carrying shaft in section, and Fig. 17, a section taken at the line 17 on Fig. 6 and viewed in the direction of the arrow, to show the disposition within the drum of the means provided for circulating steam through the mold-bases to free therefrom the finished articles and facilitate their delivery. Fig. 18 is an enlarged end view, partly in elevation and partly in section, of one of the four similar molds employed, taken at the line 18—18 on Fig. 20 and viewed in the direction of the arrows; Fig. 19, a similar side view of the same taken at the line 19—19 on Fig. 20 and viewed in the direction of the arrows; Fig. 20, an enlarged plan view of the same; Fig. 21, a perspective view of one of the mold-partitions, and Fig. 22, a like view of one of the similar sections of which the side walls of the mold are formed. Fig. 23 is a plan section of the base of the machine, showing the means employed for actuating the pallets upon which the finished articles are delivered, and also showing, partly by dotted representation, the operating mechanism for said actuating means; Fig. 24, a view in sectional elevation and partly in dotted representation, showing the mechanism employed for operating the pallet receiving-table, and Fig. 25, an enlarged transverse section through the pallet-delivery track, taken at the line 25 on Fig. 23 and viewed in the direction of the arrow. Fig. 26 is a view in side elevation, diagrammatic in its nature, showing the mold-actuating cam-ring and its operating cam-bar and showing the relative positions assumed by the parts in the tamping, pressing and discharging operations of the machine, and Fig. 27, a similar view of the same, but showing the relative positions of the parts during each partial rotation of the drum. Fig. 28 is a perspective view showing a brick-delivery pallet with a set of completed bricks upon it, and Fig. 29, a similar view of the pallet-elevating table. Fig. 30 is an end view of the eccentric shaft which carries the outer-end link of the toggle for exerting the pressing action to compact a set of the bricks in the mold, this view also showing, by dotted representation, the handle employed for setting the shaft to adjust the toggle with reference to the mold.

The bed 31 of the machine is a substantial structure of rectangular shape, and is shown best in Fig. 23. It is formed, for the sake of facility in handling it, of two similar longitudinal halves, each consisting, for the sake of lightness, of a hollow casting as to the main portion of the frame, with narrow hollow extensions 32 on one end; and the sections are bolted together through their abutting inner walls or webs, as shown in Fig. 9. To the top of each side-rail of the bed is bolted a similar frame 33, preferably formed in two longitudinal sections bolted together through their contiguous flanges, as represented, this framework so rising from the bed affording bearings for parts of the mechanism hereinafter described. A yoke-shaped head 34 rises from the extreme outer end of the narrow extension 32 of the bed, also for supporting parts of the mechanism hereinafter described.

In bearings 35 provided on the opposite side-walls of the frame, near the transverse center of the machine, is journaled a shaft 36 carrying to rotate with it the mold-drum 37. A hub 38 of the rectangular shape in cross-section illustrated is keyed on the shaft, between its ends, to rotate with it. From each of the four faces of the hub there extends, thus radially from the shaft, a similar mold-base, denoted on the drawings, respectively, as 39, 40, 41 and 42. Each of these mold-bases, in the preferred form illustrated, consists of three cast-metal arms 43 bolted through their base-flanges rigidly to the hub 38 to extend parallel with each other and form the intervening longitudinal spaces 44, 44, (Fig. 19) for the purpose hereinafter explained. On the outer end of each arm 43 is bolted a plate 45, preferably of chilled iron to present a smooth outer surface and afford a mold-bottom. The walls of each mold 46 forming a rectangular structure, consist of end-plates 47, 47, each having a chilled-iron lining 48, and sides, each consisting of a plurality (as three) of similar plates 49, with tongues 50 on their ends to fit into recesses in the lining-plates and similar recesses in partitions 51 and 52, preferably of chilled-iron, which divide the mold into three similar compartments 53, each of the shape of a brick or other article to be molded. The sections of the mold-walls are securely fastened together by bolts 54 passing through the plates 47 near their corners, through the side-plates 49 and the interposed partitions and lining-plates. The wall-structure of each mold conforms to and fits snugly, but yieldingly, about the outer end of the respective series of arms 43, the end-plates being provided with guiding tail-pieces 55 to work between flanges 56 on the sides of the outer arms 43, each tail-piece carrying near its inner end, on a boss 57 there provided, an anti-friction roller 58 for a purpose hereinafter stated. The circumferential wall of the drum 37 is composed of similar segmental plates 59 carrying inwardly projecting perforated ears 60, at intervals, each segmental-plate extending between a pair of the molds, to effect complete closure of the drum circumferentially between molds, the ends of the drum being closed by similar heads 61 bolted to the segmental sections 59 through their ears 60, and also bolted to the ends of the hub 38 near its corners. In each head 61 are provided four radial slots 62 at equal distances apart, each pair of these slots in the opposite heads being adapted to receive and guidingly confine the hubs or bosses 57 on a mold.

Each of the three arms 43 of every one of the four sets thereof contains two longitudinal steam-passages 63, 64, for supply and exhaust, respectively, extending from near its inner end to a steam-chamber 65 formed in its outer end in proximity to the mold-bottom 45. In the shaft 36 is formed a steam-inlet passage 66 leading from one end of the shaft lengthwise and centrally therein nearly to its transverse center, and having coupled to its outer end a steam-supply pipe 67 communicating with a supply of live-steam (not shown). At its inner end, the duct 66 is directed to extend transversely through the shaft 36 and hub 38 to a pipe 68 (Fig. 2) carrying an annular steam-pipe 69 having manifolds 70 extending horizontally from it along corresponding sides of the respective arms 43 of the mold-bases; and each manifold 70 has a nozzle 71 extending at a right-angle from it into a passage 63 at its inner end. Another annular steam-pipe, like the pipe 69, is supported at the opposite end of the hub (see Fig. 17), by a pipe 72 communicating through the hub and shaft 36 with an exhaust-duct 73 leading lengthwise and centrally of the shaft, from near the transverse center thereof to its opposite end, where it is coupled with an exhaust pipe 74. This second annular steam-pipe, which is provided for the exhaust, and which is denoted as 75 in the drawing, has manifolds 76 projecting horizontally from it at intervals to extend along the sides of the arms 43 opposite the sides thereof along which the manifolds 70 extend, each manifold 76 communicating with a steam-passage 64 through a nozzle 77.

A supplemental frame consisting of parallel horizontal bars 78, 78 bolted to the ends of the side-frames 33 and connected at their outer ends by a tie-bar 79, forms the guiding support for a tamper-housing 80, provided on its sides with flanges 81, which embrace the bars 78, to permit the housing to slide thereon. In the upper part of the housing, at its outer end, is journaled a shaft 82 carrying a pair of outer eccentrics 83, a pair of intermediate eccentrics 84 and a central eccentric 85 (see Figs. 10—12). A tamping-head 86, containing longitudinal slots 87, has a pair of arms 88 extending backward from it, at which it is supported by hangers 89, 89 suspended in the housing from its upper wall; and in the arms 88 at their forward ends is rigidly supported a pivot-pin 90, which also passes through a bearing 91 projecting from the rear end of the tamper-head, this pin having journaled upon it the forward ends of rods 92 extending from the eccentrics 83 and also having pivotally connected with its projecting ends hangers 93 pivotally suspended, like the hangers 89, in the housing 80 from its upper wall. Thus the tamper 86 is supported by the links to adapt it to be reciprocated in a horizontal plane. With the tamper 86 eccentrically connected with the shaft 82, are co-operatively assembled two other tampers 86¹ and 86², the three forming a set, and all being alike except that the tamper 86¹ has its rod-connections 92 with the eccentrics 84, while the tamper 86² has its central rod-connection with the eccentric 85; and that the head of each tamper 86¹ and 86² is provided in the section thereof divided by the slots 87, 87, with a centrally perforated dish-like cavity 94, for a purpose hereinafter described. Another set of three tampers, in all particulars like the set thereof thus described, except that each is provided with the perforated concavities 94, forms the lower tamper-set. The members of this lower set 86¹⁰ 86¹¹, and 86¹² are connected by their rods, like those of the upper set, with eccentrics on a lower shaft 82¹, journaled in the rear end of the housing in vertical line with the shaft 82. Instead of being suspended, like the members of the upper set, those of the lower set are pivotally supported at corresponding points, by links 89¹, 93¹ extending upward from the lower wall of the housing, but like the hangers 89, 93, to cause the lower tampers to reciprocate in horizontal planes. The heads of the tampers are so close together that they rub against each other in reciprocating. On the shaft 82 is a belt-pulley 95, and a similar belt-pulley 96 is provided on the shaft 82¹, both pulleys being connected, for driving the shafts, with an overhead drive-shaft (not shown).

Between the housing 80 and drum 37 is mounted over an inlet-opening, across which the tampers reciprocate, a box or chute 97 for directing into the paths of the tampers the moist material 98 (as cement or concrete) out of which the articles to be produced by the machine are formed, this material being supplied by gravity through a hopper 99, surmounting the box. On the forward side of the box 97 is a spring-pressed scraper 100 (Figs. 13 and 14), adapted to bear yieldingly against the surface of the drum; and below the tampers is supported on brackets 101, a receptacle 102 to catch the material which works downwardly through the tampers and thus prevent the waste thereof.

To the supplemental-frame bars 78 are bolted, to depend therefrom, ears 103. On the lower ends of these ears are fulcrumed, at 104, similar levers 105, each having its upper end bifurcated to embrace a stud 105' projecting from a side of the housing 80, as clearly shown in Figs. 1 and 9, whereby turning of the levers slides the housing on its supporting bars 78. With the lower end-portions of the levers 105 are adjustably connected links 106, which are themselves adjustable, these links being pivotally connected with adjacent ends of parallel bars 107, bolted at their opposite ends to a crosshead 108. The bars 107 are confined, to adapt them to be reciprocated, in longitudinal guide-bearings 109 provided on inner sides of frames 33, the confinement being afforded by plates 110 provided at intervals, as shown in Fig. 5.

In a bearing 111 on the cross-head 108 is confined a journaling-pin 112, to the projecting ends of which are pivotally connected the straps 113 of eccentrics 114 on a shaft 115 journaled in the frame of the machine. At its center the shaft 115 contains a crank-section 116 having confinedly journaled upon it the lower end of an upright toggle-operating rod 117, the upper end of which is connected with the central pin 118 of a toggle-device having one bifurcated link 119 journaled on a stationary shaft 120 supported in bearings on the frame, the bifurcated ends of this link being pivotally connected with the pin 118; and a pair of links 121, forming the other link of the toggle, are pivotally connected at one end with the pin 118 and at the opposite end with a pin 122 passing through the back of a presser-head 123 carrying on its face a plate 124, preferably of chilled iron and of dimensions greater than the internal dimensions of the mold-walls, thereby when a mold is brought coincident with this presser-head, the plate 124 will bear, for the purpose hereinafter explained, against the edges presented to it of the wall-structure of the mold. The head 123, like the heads of the mold-bases, contains a steam-chamber, 125, for heating it to prevent sticking of the material to the plate 124, and this chamber is fed through a steam-pipe 126 leading from a source of steam-supply (not shown), the steam exhausting through another pipe 127. The head 123 is supported at its ends on guides 128 projecting inwardly from the frame-sides 33 (Figs. 3 and 5).

For actuating the parts thus far described, mechanism is employed, of which the following is a description: A power-shaft 129 journaled in the frame of the machine at one end thereof, carries a belt-pulley 130 and a pinion 131, meshing with a gear-wheel 132 on a shaft 133, journaled in bearings on the frame. The shaft 133 carries, on one end, a pinion 134 meshing with the large gear-wheel 135 on the shaft 115, this large gear being provided, for the purpose hereinafter explained, with a wrist-pin 136. On the end of the drum-shaft 36 which is on the same side of the machine as the gear-wheel 135, is keyed an abutment wheel 137, of the nature of an internal ratchet, having four teeth or abutments 138, 139, 140 and 141 equidistant apart. Loosely surrounding the hub of the wheel 137, and confined thereon by a cap 142, which is screwed to the end of the shaft 36, is a collar 143 provided with an arm 144, extending radially from it and having pivotally supported on its free end-portion a finger 145 bearing against the flange about the abutment-wheel, and in the path of which finger the abutments or teeth on the wheel lie. The pivot-pin 146 of the finger 145 has journaled upon it one end of a pitman-rod 149, having its other end journaled upon the wrist-pin 136.

In the relative positions of the parts of the machine as disclosed in the assembled views, and as will be most readily apparent from Fig. 2, the mold on the mold-base 39 registers with the tampers which are being actuated to tamp the material 98 as it comes from the supply, into the respective mold; the mold on the base 40 is idle, and contains the material tamped into it for producing three bricks; the mold on the base 41 is in registry with the presser-head 123, which is pressing the material to form the bricks in the mold; and the mold on the base 42 is discharging the finished bricks which were compressed when that mold occupied the position of the mold on the base 41. Rotation of the pulley 130 in the direction of the arrow drives the shaft 129, and through the gear connections of the latter with the gear-wheel 135 continuously rotates the shaft 115. In the rotation of the large gear 135, it first retracts the pitman 149, throughout one-half its rotation, and throughout the other half engages the finger 145 with the abutment 138 in its path, thereby turning the drum through one-quarter of a revolution, and leaving it in that position until the large gear has made again the first half of its rotation, in the second half of which the finger 145 will encounter an abutment or tooth 139 with the result of turning the drum through another quarter of a revolution. In this way, under the continuous rotation of the shaft 115, the finger 145 is alternately retracted and advanced, and in each advance it encounters in turn a different one of the four abutments 138, 139, 140 and 141 to register one mold with the tampers, the diametrically opposite mold with the presser-head, and an intermediate mold with the delivery mechanism hereinafter described.

When a mold is in registry with the tampers, which are continuously reciprocating, under the rotation of their drive-shafts 82, 82¹, but with different strokes owing to their eccentric connections with the shafts, material 98 which drops into the paths of the tamper-heads is tamped by their action into the mold. The slots 87 in the tamper-heads adapt them to clear the mold-partitions and thus effect the tamping uniformly in all of the three mold-compartments. As the thickness of the material in this mold increases, since the length of stroke of the tampers, which is alike of each, is unvarying, they must recede from their work, by backward movement of the housing 80. This movement is imparted to the housing in the rotation of the shaft 115, by the action of the eccentrics 114, which move the bars 107 in the direction toward the left-hand end of the machine in Fig. 1, to turn the levers 105 against the studs 106 on the housing. Obviously, as an upper tamping-head is retracted from beneath the feed-box 97, the material from the latter drops upon the next lower tamping-head, and so on throughout the vertical series thereof, thus getting into the paths of their ends. Any of the material that fails to reach the advanced end of a tamper-head, or which is forced backward between heads under the pressure exerted by them, will not lodge between them and clog their action, because of the provision of the perforated concavities 94 provided in each of the tamper-heads except the uppermost one, which permits such material to be worked through the openings, as surplus, and eventually be discharged into the receptacle 102. While the described tamper-action is proceeding, the material previously tamped in a similar manner into the next succeeding mold on the base 40 is not being operated upon in any way, but the material in the mold then registering with the presser-head 123, and which had previously been subjected to the action of the tampers when that mold registered with them, is being pressed and compacted into bricks. This pressure is produced from the shaft 115 with the toggle-bar 117 in the position illustrated, wherein it straightens the toggle to press the plate 124 on the head 123 with great force against the edges of the wall-structure of the adjacent mold, which, because of its described movable function in the slots 62 in the drum-heads, yields under the pressure of the plate 124 to permit it to be exerted against the material in the mold for compacting it. Provision is made for adjusting the pressure of the toggle by providing the journaling ends of the shaft 120 as eccentrics $120^1$, with a lever $120^2$ on the frame of the machine, and secured at one end to the extremity of one eccentric $120^1$; this lever being formed with an expanded section $120^3$ containing a segmental slot $120^4$, through which a set-pin $120^5$ works in the frame of the machine. By turning the shaft 120 by the lever, the toggle may be set to bring the presser-head near to or farther from the circumference of the drum. The continued rotation of the shaft 115 raises the rod 117 to break the toggle and withdraw the presser-head from engagement with the mold registering therewith.

The mold on the base 42 is shown in the discharging position of delivering the articles which were compressed and completed in it when it occupied the position of registering with the presser-head. The manner of effecting the delivery is accomplished by mechanism forming an important feature of my invention, and of which the following is a description: At 150, 150, are shown two similar rings rigidly fastened through ears 151 and a foot 152 to the frame of the machine at opposite sides of the drum 37, that is, adjacent to the drum-heads 61, each of these rings being provided about its inner face with a path 153 into which the anti-friction rollers 58 on the mold-walls, enter for guidance. Each of these rings, which is approximately concentric with the drum-shaft, is formed with an offset 154 at a point adjacent to the presser-head, thereby to afford a segment 155 of shorter radius to permit the described receding movement of the wall structure of a mold when under the pressure of the plate 124 on the presser-head 123. Each of these rings, furthermore, contains a movable section 156 pivotally supported through a lug 157 by a pin 158 on the frame of the machine and adapted to register at its free ends with the respective ends of the remainder of the ring. On the free end of each section 156 farthest from its pivotal support is an outwardly-projecting stud 159 entering a cam-slot 160 formed in a plate 161 secured on an adjacent reciprocable bar 107, being one of the two bars hereinbefore described as performing the function of moving the housing 80.

When a mold, through a partial rotation of the drum, leaves the presser-head, by the action of which it has been forced into the offsets 154 in the rings 150, it travels through the paths in the ring-sections 155 until the anti-friction rollers 58 upon it clear those ring-sections, and enter the paths of the adjacent ends of the pivotal ring-sections 156. During each partial rotation of the drum the rings 150 are in the condition represented of that shown in Fig. 27, namely with each pivotal section 158 registering at its ends with those of the adjacent end-sections, being maintained in that condition by the positions of the bars 107, to which they are brought by the eccentrics 114 on the rotating shaft 115 in moving the tamper-housing away from the drum, as described. Each time the drum is brought to a standstill, the eccentrics 114 move the bars 107 in the direction to effect movement of the tamper-housing toward the drum, and this movement of the bars causes the cam-slots 160 in the plates 161, in riding upon the studs 159, to raise the adjacent ends of the pivotal sections 156 of the rings to the position of the section 156 represented in Fig. 26. Thus, when a mold attains and is stopped at the position represented by the lowermost mold in Fig. 2, its wall structure will be raised, as shown, by the action of the cam-slots 160, clear of its contents, which are left deposited on a pallet automatically brought into position to receive such contents as hereinafter described.

A rock-shaft 162, journaled in opposite sides of the frame 31, carries on one end an arm 163 provided on its free end with an anti-friction roller 164 movably confined in the path of a cam-head 165 secured on the adjacent end of the rotary shaft 115. A track 166, composed of parallel angle-bars, is supported to extend in a plane transverse of the center of the drum and below the latter, by being suspended on the lower end of an upright rectangular rack-frame 167, having its upright members composed of angle-bars, and suitably tied together, as represented (Fig. 6). This frame is securely fastened between brackets 168 projecting laterally from a side of the frame 31. It is open at both ends and adapted to receive a stack of pallets 169 of the preferred construction represented in Fig. 28, and consisting of a rectangular plate having a smooth top and three parallel ribs 170 on its under side, the dimensions of the pallet adapting it to support three bricks 171 forming the product of each pressing operation of the machine. The stack of pallets in the rack 167 rests on the track 166 to adapt the feeding of pallets into position to receive the completed articles from the machine, to be produced from the base of the stack. A table 172, in its normally lowered position, occupies the space between the inner end of the track 166 and the adjacent end of a similar delivery-track $166^1$ supported on bearings $168^1$ bolted to the bed of the machine. This table is shown in Fig. 29 and is provided with three longitudinal grooves $170^1$ in its upper side to receive the ribs 170 of the pallet and seat the latter stably. On one end of the table a projecting cam-finger 173 is provided for a purpose hereinafter explained; and on the underside of the table, and centrally thereof, is rigidly secured at its head 174, a guide-rod 175 to depend vertically therefrom and reciprocate in a guide-tube 176 provided on a cross-bar 177 bolted at its ends on the tops of the sides of the base 31. An arm 178 embraces at one bifurcated end the head 174 and is pivotally connected therewith by a pin 179, the opposite end of this bar having a bifurcated head 180, through which the rock-shaft 162 passes and which embraces a collar 181 secured on the rock-shaft by a set-screw 182. Rising vertically from this collar is a finger 183 in which works a set-screw 184 to abut against a similar finger 185 rising from the adjacent end of the arm 178. A pin 186 passes loosely through the fingers 183 and 185 and has confined about it between the finger 185 and a stop 188 on its free end, a spiral spring 187. By adjusting the set-screw 184, the throw of the table 172 is regulated; and the spring-device on the arm 178 renders the engagement of the table with the articles received upon it, as hereinafter described, yielding to avoid impairment of the articles as in the event of any accidental obstruction to the action of the table.

To the outer face of the cam-head 165 is pivotally connected one end of a link 189 having its opposite end pivotally connected with a bar 190 mounted to slide longitudinally in bearings 191 projecting from a side of the frame 33. A stud 192 depends rigidly from this bar between its ends and has journaled on its lower extremity a link 193 connected with a species of bell-crank lever consisting of an arm 194 pivotally connected with said link and terminating in a sleeve 195 rotatably surrounding a stud 196 rising from the bed 31, and an arm 197 extending from said sleeve. A link 198 is pivotally connected at one end with the free end of the bell-crank arm 197, and terminates at its opposite end in a collar 199 rotatably confined about a stud 200 depending from the base of a slide 201 provided with lateral flanges 202 at which it seats on the horizontal webs of the rails forming the track 166.

To facilitate explanation of the operation of the delivery-mechanism of the machine a pallet 169 must be supposed to be imposed upon the table 172, and another pallet to be imposed on the track 166 between the table and the stack of pallets in the rack 167 (see Fig. 6). The movements of the machine are so timed and the cam 165 is of such shape that just prior to the stoppage of the drum at the end of each partial revolution thereof, the cam rocks the shaft 162 to raise the table 172 to within a small fraction of an inch below the mouth of the mold then registering with it, whereby the bricks in that mold, may be received on the pallet. Thereupon the wall-structure of this mold is raised by the action of the ring-sections 156 in the manner already described, to free the mold contents and clear the same. The heating through the employment of steam, as described, of the base-plate 45, is sufficient to vaporize moisture between it and the adjacent surfaces of the bricks with the result of freeing the bricks from the surface and the advantage of avoiding all tendency of tearing or fracturing the completed pressed green product. While the tamping and pressing operations are proceeding during the period that the drum is stationary, the action of the cam 165 rocks the shaft 162 to lower the table 172 with the bricks upon it until the table registers with the tracks 166, 166¹. When the table reaches this lower position, the action of the cam 165 moves the bar 190 to turn the bell-crank connected with it in the direction to advance the slide 201 underneath the rack 167, and in sliding to encounter the lowermost pallet in the stack thereof and slide it along the track 166 against the next pallet in its path, which, in turn, engages the pallet on the table and moves that pallet, with the bricks upon it, off the table upon the track 166¹, whereon it may be further moved by the succeeding operation or operations of the delivery mechanism, like the operation just described and be thus eventually transferred to a suitable conveyer, or the delivered pallet with the bricks upon it may immediately be taken off the track 166¹. The described sliding action of the plate 201 obviously positions on the table 172 the next succeeding pallet, bringing adjacent thereto the pallet previously moved from beneath the stack. The continued rotation of the cam 165 returns the pusher-plate 201 to its initial position, as represented in Fig. 23, to take it from beneath the stack and permit the latter to drop upon the track, and also, just before the drum completes another partial rotation, turns the rock-shaft 162 to raise the table 172 into position to receive the set of bricks from the next mold brought into registry with it. In the rise of the table, the cam 173 upon it will force back upon the track 166 the adjacent pallet 169 thereon in the event that in feeding the last-named pallet, it should be moved so far as to cause its edge to overlap the adjacent edge of the table.

The described operation of the delivery mechanism affords the material advantage of avoiding the subjection of the green product to any rubbing or dragging action, which would tend to break or crack it.

What I claim as new and desire to secure by Letters Patent is—

1. In a brick-machine, the combination of a rotatable drum, molds disposed at intervals about said drum, tampers supported at one point adjacent to the periphery of the drum, a plurality of eccentric-actuated reciprocating tampers supported at one point adjacent to the periphery of the drum to act against the material to be compacted in a single mold, receiving-means for the product of the machine supported at a third point adjacent to said periphery, and drum-driving means constructed and arranged to rotate said drum intermittently to register molds thereon with said points in each partial rotation of the drum.

2. In a brick machine, the combination of a rotatable drum, molds disposed at intervals about said drum, a plurality of eccentric-actuated reciprocating tampers supported at one point adjacent to the periphery of the drum to act against the material to be compacted in a single mold, a power-driven toggle-actuated presser-head supported at another point adjacent to said periphery, receiving means for the product of the machine movably supported at a third point adjacent to said periphery, and drum-driving means constructed and arranged to rotate said drums intermittently to register molds thereon with said point in each partial rotation of the drum.

3. In a brick-machine, the combination of a rotatable drum, molds disposed at intervals about said drum, a plurality of co-operating power-driven tampers supported at one point adjacent to the periphery of the drum, a movable power-actuated support for said tampers, a power-driven presser-head reciprocably supported at another point adjacent to said periphery, receiving means for the product of the machine supported at a third point adjacent to said periphery, and drum-driving means constructed and arranged to rotate said drum intermittently to register molds thereon with said points in each partial rotation of the drum.

4. In a brick-machine, the combination with a bed and frame thereon, of a drum rotatably mounted on the frame, and provided with molds at intervals, a plurality of eccentric-actuated reciprocating tampers supported on said frame at a point adjacent to the periphery of the drum to act against the material to be compacted in a single mold, and drum-driving means constructed and arranged to rotate said drum intermittently to register a mold thereon with said tampers in each partial rotation of the drum.

5. In a brick-machine, the combination with a bed and frame thereon, of a drum rotatably mounted on the frame and provided with molds at intervals, a tamper-housing movably supported on said frame, a plurality of tampers reciprocally supported in said housing, adjacent to the periphery of the drum to reciprocate in horizontal planes, and drum-driving means constructed and arranged to rotate said drum intermittently to register a mold thereon with said tampers in each partial rotation of the drum.

6. In a brick-machine, the combination of a rotatable drum having a mold-opening in its wall, a mold-base extending from the drum-shaft to register with said opening, a mold consisting of bottom-plates fixed on the outer end of said base and a wall-structure surrounding said base and containing partitions, a plurality of power-driven tampers supported adjacent to the periphery of the drum and provided with heads containing longitudinal slots, and drum-driving means constructed and arranged to rotate said drum intermittently to register said mold with said tampers.

7. In a brick-machine, the combination of a rotatable drum, a series of four molds disposed at equal intervals apart about said drum, a plurality of power-driven tampers supported at one point adjacent to the periphery of the drum, a power-driven presser-head supported at another point adjacent to said periphery, receiving means for the product of the machine supported at a third point adjacent to said periphery, and drum-driving means constructed and arranged to rotate said drum intermittently to register, in each partial rotation thereof, three of said molds respectively with said tampers, said presser-head and said receiving means.

8. In a brick-machine, the combination of a rotatable drum, molds disposed at intervals about said drum, each mold consisting of a fixed bottom-plate and a wall-structure supported to extend about said plate and movable back and forth thereon, tamping means supported at one point adjacent to the drum, a power-driven presser-head reciprocably supported at another point adjacent to said periphery, receiving means for the product of the machine supported at a third point adjacent to said periphery, drum-driving means constructed and arranged to rotate said drum intermittently to register molds thereon with said points in each partial rotation of the drum, and means constructed and arranged to co-operate with said drum-driving means to move said wall-structure at said receiving point away from its contents.

9. In a brick-machine, the combination of a rotatable drum having slotted heads, molds disposed at intervals about said drum, each mold consisting of a fixed bottom-plate and a wall-structure supported to extend about said plate and movable back and forth thereon, with bosses on opposite sides of the wall-structure projecting through slots in said heads and anti-friction rollers journaled on the bosses, cam-rings stationarily supported at opposite ends of the drum, and each provided with a lower pivotal section, said anti-friction rollers extending into the cam-paths on said rings, tamping means supported at one point adjacent to the drum, a power-driven presser-head supported at another point adjacent to said periphery, receiving-means for the product of the machine supported at an intermediate point adjacent to said periphery, drum-driving means constructed and arranged to rotate said drum intermittently to register molds thereon with said points in each partial rotation of the drum, and means constructed and arranged to co-operate with said drum-driving means to turn said pivotal sections of the rings and raise the wall-structure of the mold engaging therewith for the purpose set forth.

10. In a brick-machine, the combination of a rotatable drum carrying a mold, a tamper-housing supported adjacent to the periphery of said drum, a plurality of power-driven tampers having link-supports in said housing adapting them to be reciprocated in parallel planes one upon the other, and drum-driving means constructed and arranged to rotate said drum intermittently to register said mold with said tampers in each rotation of the drum.

11. In a brick-machine, the combination of a rotatable drum carrying a mold, a plurality of power-driven tampers supported one above the other adjacent to the periphery of said drum and provided with heads having dished perforated recesses, and drum-driving means constructed and arranged to rotate said drum intermittently to register said mold with said tampers in each rotation of the drum.

12. In a brick-machine, the combination of a mold-carrying drum, means constructed and arranged to rotate said drum intermittently, a receiving-table operatively connected with said driving-means and supported to rise and fall with reference to a mold when brought into registry therewith, a track with which said table registers in its lowered position, a pallet-rack supported over said track and slide-plate on the track co-operating with said receiving-table, for the purpose set forth.

13. In a brick-machine, the combination of a mold-carrying drum, means constructed and arranged to rotate said drum intermittently, a receiving-table operatively connected with said driving-means and supported to rise and fall with reference to a mold when brought into registry therewith, a delivery-track extending transversely of the machine, a pallet-supply track spaced from and alining with said supply track, with both of which tracks said table registers in its lowered position in the space between them, a pallet-rack supported over said supply-track and a slide-plate thereon co-operating with said receiving-table.

14. In a brick-machine, the combination of a mold-carrying drum, means constructed and arranged to rotate said drum intermittently, a cam actuated receiving-table operated by said driving-means and supported to rise and fall with reference to a mold when brought into registry therewith, a track with which said table registers in its lowered position, a pallet-rack supported over said track, a slide-plate on the track, and a bell-crank connection between said slide-plate and the cam which actuates said table.

15. In a brick-machine, the combination of a mold-carrying drum, means constructed and arranged to rotate said drum intermittently, a rock-shaft carrying a receiving-table on an arm extending to register said table with the mold-path, an adjustable yielding connection between said arm and shaft, and a cam having an arm-connection with said shaft and operatively connected with said driving-means, for the purpose set forth.

16. In a brick-machine, the combination of a mold-carrying drum, means constructed and arranged to rotate said drum intermittently, a rock-shaft, an arm extending from said rock-shaft and having a flexible connection therewith, a receiving-table on said arm registering with the mold-path, a guide for the movements of said table, and a cam having an arm-connection with said shaft, and operatively connected with said driving-means, for the purpose set forth.

17. In a brick-machine, the combination of a mold-carrying drum, means constructed and arranged to rotate said drum intermittently, a rock-shaft carrying a receiving-table extending into registry with the mold-path, a cam having an arm-connection with said shaft and operatively connected with said driving-means, a track with which said table registers in its lowered position, a pallet-rack supported above the track, a slide-plate on the track, a bell-crank having a link connection with the slide-plate, and a slide-bar connected with the bell-crank and having a link-connection with said cam, for the purpose set forth.

FREDERICK P. ROSBACK.

In presence of:
R. A. SCHAEFER,
J. H. LANDES.